United States Patent
Ventelae

(10) Patent No.: US 10,390,018 B2
(45) Date of Patent: Aug. 20, 2019

(54) EFFICIENT CONTEXT HANDLING IN ARITHMETIC CODING

(71) Applicant: GOOGLE LLC, Mountain View, CA (US)

(72) Inventor: Jaako Tuomas Aleksi Ventelae, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 28 days.

(21) Appl. No.: 15/689,291

(22) Filed: Aug. 29, 2017

(65) Prior Publication Data

US 2018/0007360 A1  Jan. 4, 2018

Related U.S. Application Data

(63) Continuation of application No. 14/599,773, filed on Jan. 19, 2015, now Pat. No. 9,781,424.

(51) Int. Cl.
*H04N 19/13* (2014.01)
*H04N 19/18* (2014.01)
*H04N 19/136* (2014.01)
*H04N 19/129* (2014.01)
*H04N 19/134* (2014.01)
*H04N 19/423* (2014.01)

(52) U.S. Cl.
CPC .......... *H04N 19/13* (2014.11); *H04N 19/129* (2014.11); *H04N 19/134* (2014.11); *H04N 19/136* (2014.11); *H04N 19/18* (2014.11); *H04N 19/423* (2014.11)

(58) Field of Classification Search
CPC .. H04N 19/134; H04N 19/423; H04N 19/129; H04N 19/18; H04N 19/136; H04N 19/13
See application file for complete search history.

(56) References Cited

U.S. PATENT DOCUMENTS

| 2012/0099646 A1* | 4/2012 | Coban | H04N 19/176 |
| | | | 375/240.12 |
| 2013/0051459 A1* | 2/2013 | Kirchhoffer | H04N 19/50 |
| | | | 375/240.07 |

(Continued)

*Primary Examiner* — Neil R Mikeska
(74) *Attorney, Agent, or Firm* — Young Basile Hanlon & MacFarlane, P.C.

(57) ABSTRACT

Coding using efficient context handling in arithmetic coding is disclosed. A method for decoding a current block in a scan order includes identifying a current entropy coded transform coefficient from the current block, and entropy decoding the current entropy coded transform coefficient. Entropy decoding the current entropy coded transform coefficient may include determining, based on the scan order, a first scan order distance between a scan order location corresponding to the current entropy coded transform coefficient and a scan order location corresponding to a first context coefficient, identifying a first context coefficient value from a first location in a context coefficient register, the first location corresponding to the first scan order distance, and entropy decoding the current entropy coded transform coefficient based on the first context coefficient value. The method also includes including the entropy decoded current transform coefficient in an output bitstream.

17 Claims, 13 Drawing Sheets

(56) References Cited

U.S. PATENT DOCUMENTS

| | | | |
|---|---|---|---|
| 2013/0058407 A1* | 3/2013 | Sole Rojals | H04N 19/13 375/240.12 |
| 2013/0101046 A1* | 4/2013 | Korodi | H04N 19/1883 375/240.18 |
| 2013/0128985 A1* | 5/2013 | He | H04N 19/176 375/240.18 |
| 2013/0230097 A1* | 9/2013 | Sole Rojals | H04N 19/13 375/240.02 |
| 2013/0315300 A1* | 11/2013 | Lee | H04N 19/176 375/240.02 |
| 2014/0307801 A1* | 10/2014 | Ikai | H04N 19/91 375/240.18 |
| 2014/0348247 A1* | 11/2014 | Tsukuba | H04N 19/91 375/240.26 |
| 2014/0362925 A1* | 12/2014 | Nguyen | H03M 7/4018 375/240.18 |

* cited by examiner

700

| 99 | 81 | 42 | 0 |
| 87 | 57 | 6  | 0 |
| 61 | 11 | 0  | 0 |
| 9  | 0  | 0  | 0 |

*FIG. 7*

| 0 | 2 | 5 | 10 | 17 | 25 | 38 | 47 |
|---|---|---|----|----|----|----|----|
| 1 | 4 | 8 | 15 | 22 | 30 | 45 | 58 |
| 3 | 7 | 12 | 18 | 28 | 36 | 52 | 64 |
| 6 | 11 | 16 | 23 | 31 | 43 | 60 | 73 |
| 9 | 14 | 19 | 29 | 37 | 50 | 65 | 78 |
| 13 | 20 | 26 | 35 | 44 | 54 | 72 | 85 |
| 21 | 27 | 33 | 42 | 53 | 63 | 80 | 94 |
| 24 | 32 | 39 | 46 | 57 | 71 | 88 | 104 |

*FIG. 9*

EFFICIENT CONTEXT HANDLING IN ARITHMETIC CODING

CROSS-REFERENCE TO RELATED APPLICATION(S)

This application claims priority to and the benefit of U.S. patent application Ser. No. 14/599,773, filed Jan. 19, 2015, the entire disclosure of which is hereby incorporated by reference.

BACKGROUND

Digital video can be used, for example, for remote business meetings via video conferencing, high definition video entertainment, video advertisements, or sharing of user-generated videos. Due to the large amount of data involved in video data, high performance compression is needed for transmission and storage. Accordingly, it would be advantageous to provide high resolution video transmitted over communications channels having limited bandwidth.

SUMMARY

This application relates to encoding and decoding of video stream data for transmission or storage. Disclosed herein are aspects of systems, methods, and apparatuses for encoding and decoding using efficient context handling in arithmetic coding.

An aspect is a method for decoding a current block in a scan order. The method includes identifying a current entropy coded transform coefficient from the current block, and entropy decoding the current entropy coded transform coefficient. Entropy decoding the current entropy coded transform coefficient may include determining, based on the scan order, a first scan order distance between a scan order location corresponding to the current entropy coded transform coefficient and a scan order location corresponding to a first context coefficient, identifying a first context coefficient value from a first location in a context coefficient register, the first location corresponding to the first scan order distance, and entropy decoding the current entropy coded transform coefficient based on the first context coefficient value. The method also includes including the entropy decoded current transform coefficient in an output bitstream.

Another aspect is a method for entropy decoding a current entropy coded transform coefficient from a current block, the current block being decoded in a scan order. The method may include determining, based on the scan order, a first scan order distance between a scan order location corresponding to the current entropy coded transform coefficient and a scan order location corresponding to a first context coefficient, identifying a first context coefficient value from a first location in a context coefficient register, the first location corresponding to the first scan order distance, determining, based on the scan order, a second scan order distance between the scan order location corresponding to the current entropy coded transform coefficient and a scan order location corresponding to a second context coefficient, wherein the scan order location corresponding to a second context coefficient is spatially proximate to the scan order location corresponding to the current entropy coded transform coefficient, identifying a second context coefficient value from a second location in the context coefficient register, the second location corresponding to the second scan order distance, and entropy decoding the current entropy coded transform coefficient based on the first context coefficient value and the second context coefficient value. The method may include including the entropy decoded current transform coefficient in an output bitstream for display.

Another aspect is an apparatus for decoding a current entropy coded transform coefficient of a current block that is decoded using a scan order. The apparatus includes a memory and at least one processor configured to execute instructions stored in the memory to entropy decode the current entropy coded transform coefficient by determining, based on the scan order, a left scan order distance between a scan order location corresponding to the current entropy coded transform coefficient and a scan order location corresponding to a left context coefficient, determining, based on the scan order, an above scan order distance between the scan order location corresponding to the current entropy coded transform coefficient and a scan order location corresponding to an above context coefficient, identifying a left context coefficient value from a first location in a context coefficient register, the first location corresponding to the left scan order distance, identifying an above context coefficient value from a second location in the context coefficient register, the second location corresponding to the above scan order distance, and entropy decoding the current entropy coded transform coefficient based on the left context coefficient value and the above context coefficient value. The processor may be configured to execute instructions stored in the memory to include the entropy decoded current transform coefficient in an output bitstream.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein:

FIG. 7 is a diagram of an example of a quantized transform coefficient matrix including a block of quantized transform coefficient values in accordance with implementations of this disclosure;

FIG. 9 shows a diagram of an example of a portion of a non-contiguous entropy coding scan order in accordance with implementations of this disclosure;

DETAILED DESCRIPTION

Video compression schemes may include breaking each image, or frame, into smaller portions, such as blocks, and generating an output bitstream using techniques to limit the information included for each block in the output. An encoded bitstream can be decoded to re-create the blocks and the source images from the limited information. Coding a video stream can include entropy coding, which is a lossless compression technique that may include substituting tokens, or codewords, for bit patterns, or symbols, in the output data stream. In some implementations, the token for a symbol may be determined based on context coefficients, such as the coefficient immediately to the left of the current coefficient, the coefficient immediately above the current coefficient, or a combination of both.

In some implementations, a decoder may store each decoded coefficient for a block in a context coefficient register for use in decoding subsequent coefficients. The size of the context coefficient register may be a function of the size of the coefficient matrix used for coding. For example, the coefficient matrix may be a N×M matrix, such as a 32×32 matrix, encoded using a non-contiguous coding order, such as the coding order partially shown in FIG. 9, and the context coefficient register may include N*M coefficients, such as 1024 (32*32=1024) coefficients. In some implementations, each coefficient may be stored using B bits, such as 3 bits, and the size of the context coefficient register may be B*N*M bits, such as 3072 bits (1024*3 bits).

In some implementations, video coding using efficient context handling in arithmetic coding may include using a reduced size context coefficient register, which may reduce resource utilization and may improve timing in the decoder. Video coding using efficient context handling in arithmetic coding using a reduced size context coefficient register may include determining a scan order distance between a scan order location of a encoded coefficient and scan order locations of the corresponding context coefficients, and reading the corresponding context coefficient values from the location in the reduced size context coefficient register indicated by the corresponding distance. In some implementations, the size of the reduced size context coefficient register may be one less than the maximal scan order distance.

Figure 1:
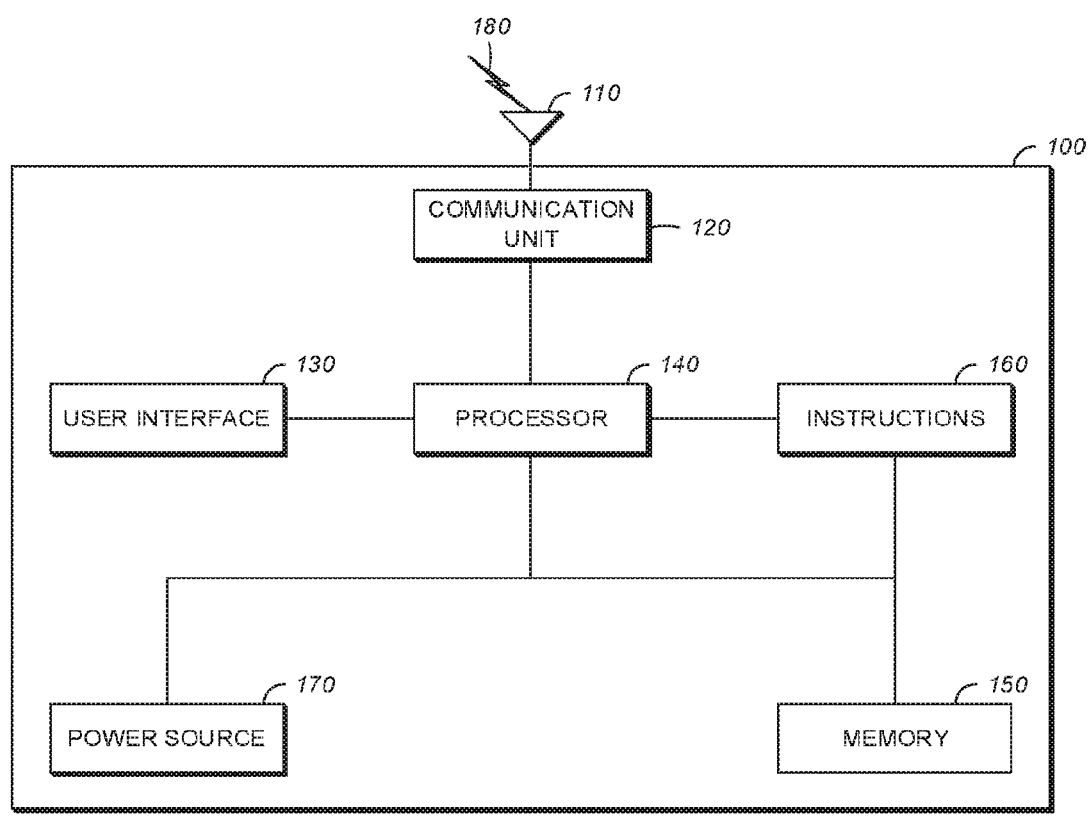
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a general purpose processor, a special purpose processor, a conventional processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
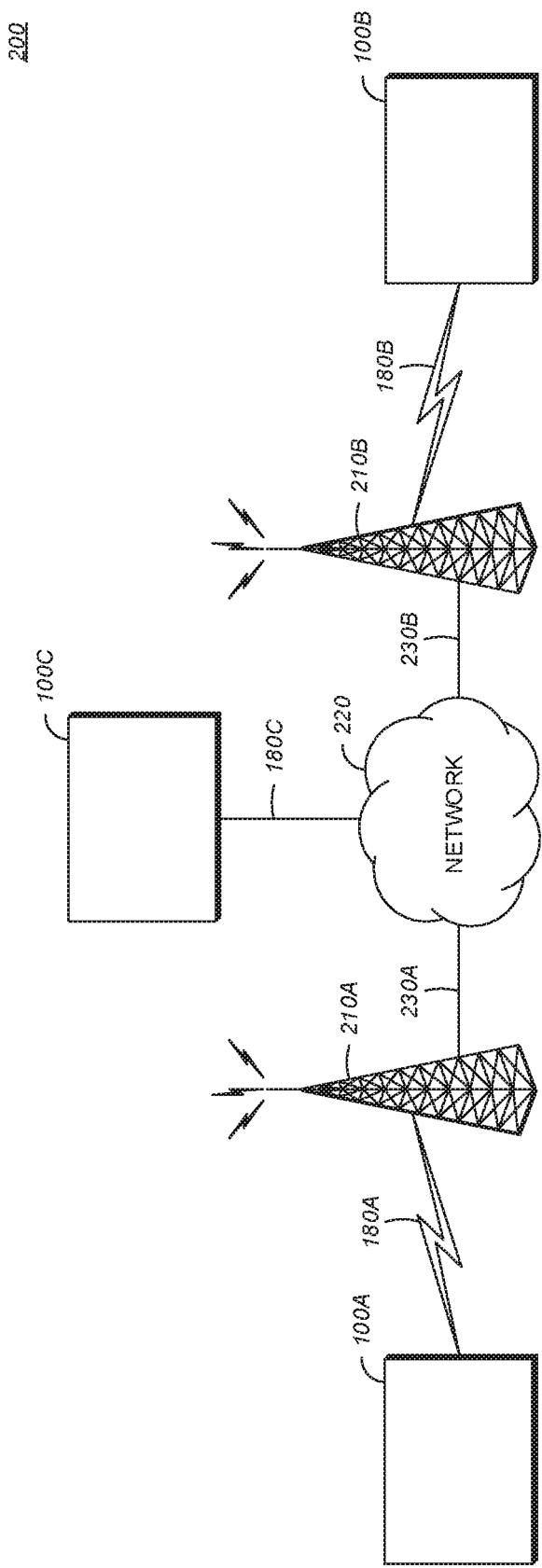
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, in an implementation the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
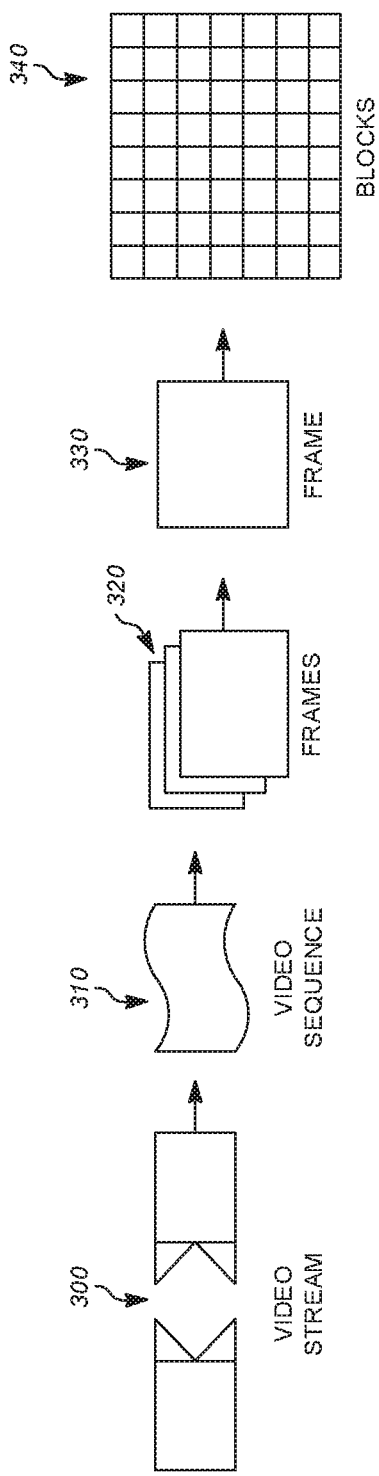
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
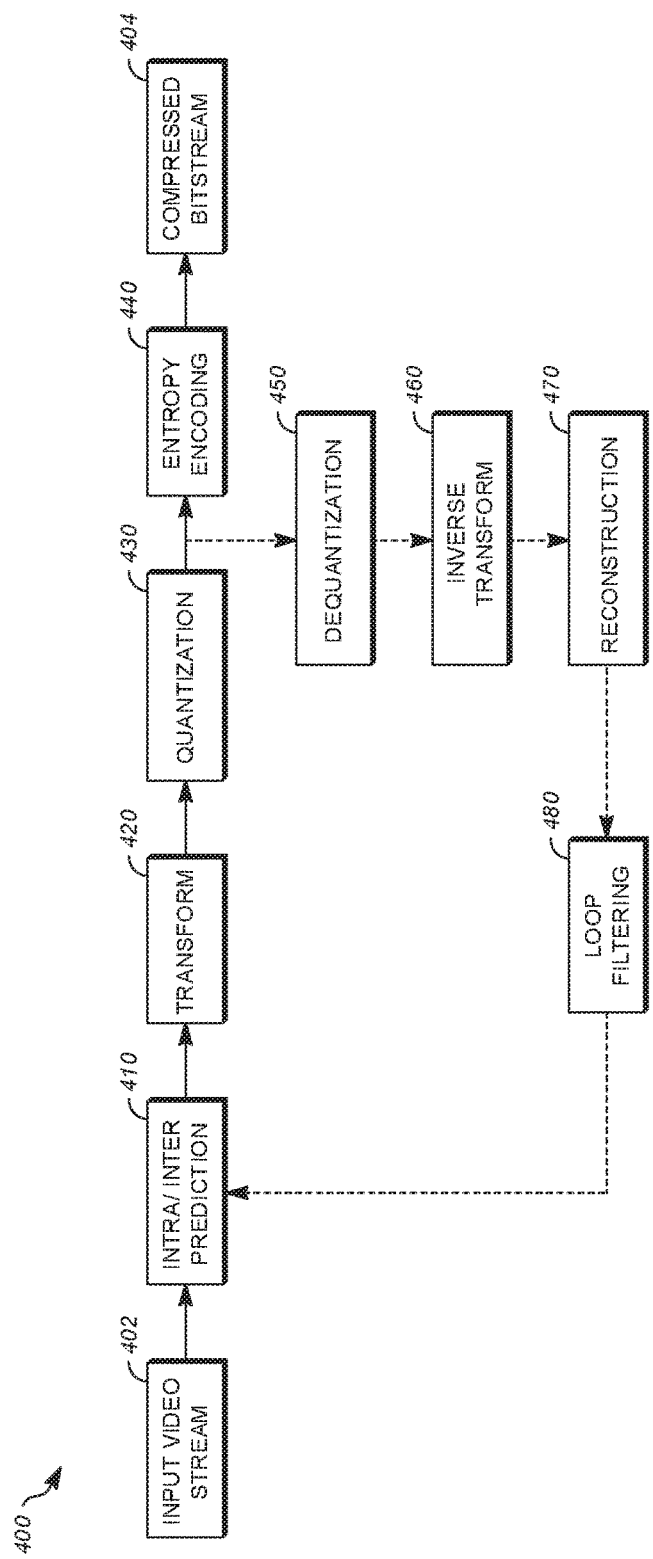
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 140 shown in FIG. 1, and may cause the device to encode video data as described herein. The encoder 400 can be implemented as specialized hardware included, for example, in computing device 100.

The encoder 400 can encode an input video stream, such as the video stream 402, such as the video stream 300 shown in FIG. 3 to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
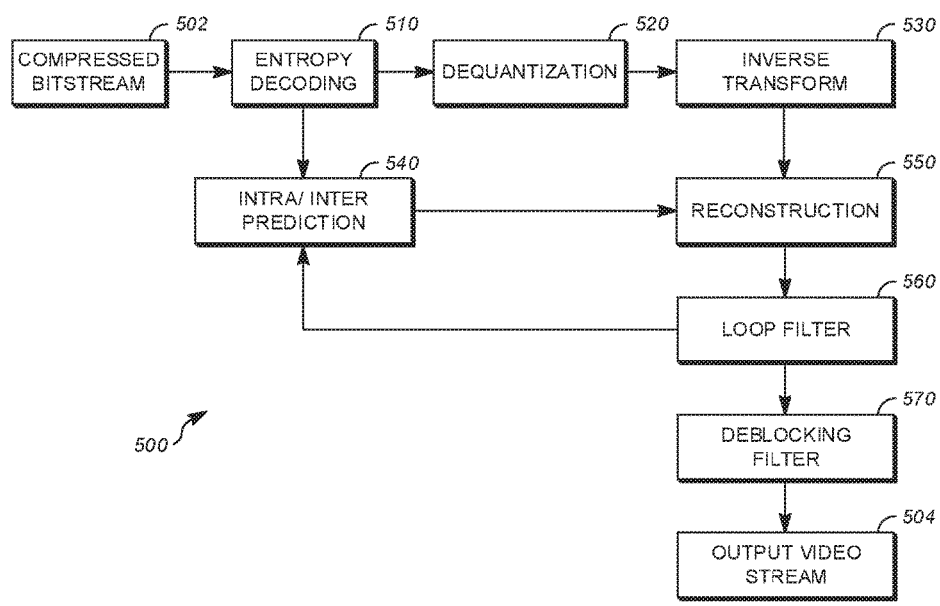
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 140 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

Figure 6:
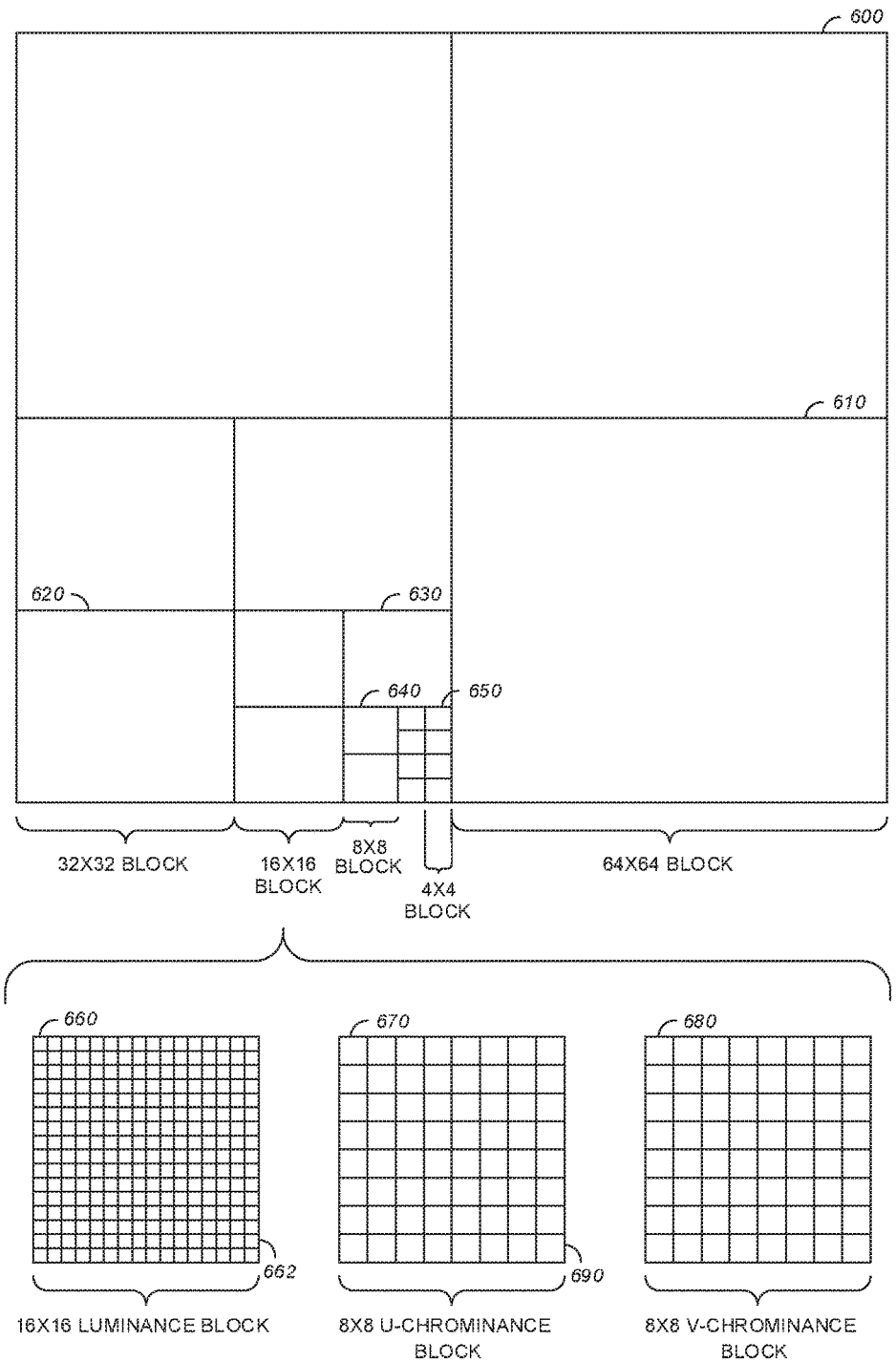
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670/680, such as a U or Cb chrominance block 670, and a V or Cr chrominance block 680. The chrominance blocks 670/680 may include chrominance pixels 690. For example, the luminance block 660 may include 16×16 luminance pixels 662 and each chrominance block 670/680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame, and using a relatively small amount of information to represent each corresponding chrominance component for the portion of the frame. For example, a portion of a frame may be represented by a high resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a block or pixel in a reference frame, or a portion of the reference frame, that corresponds with a current block or pixel of a current frame. For example, a reference frame, or a portion of a reference frame, which may be stored in memory, may be searched for the best block or pixel to use for encoding a current block or pixel of the current frame. For example, the search may identify the block of the reference frame for which the difference in pixel values between the reference block and the current block is minimized, and may be referred to as motion searching. In some implementations, the portion of the reference frame searched may be limited. For example, the portion of the reference frame searched, which may be referred to as the search area, may include a limited number of rows of the reference frame. In an example, identifying the reference block may include calculating a cost function, such as a sum of absolute differences (SAD), between the pixels of the blocks in the search area and the pixels of the current block.

In some implementations, the spatial difference between the location of the reference block in the reference frame and the current block in the current frame may be represented as a motion vector. The difference in pixel values between the reference block and the current block may be referred to as differential data, residual data, or as a residual block. In some implementations, generating motion vectors may be referred to as motion estimation, a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although motion-compensated partitioning is described herein with reference to matrix or Cartesian representation of a frame for clarity, a frame may be stored, transmitted, processed, or any combination thereof, in any data structure such that pixel values may be efficiently predicted for a frame or image. For example, a frame may be stored, transmitted, processed, or any combination thereof, in a two dimensional data structure such as a matrix as shown, or in a one dimensional data structure, such as a vector array. In an implementation, a representation of the frame, such as a two dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, the content captured within a block may include two or more areas that exhibit distinct spatial and temporal characteristics. For example, a frame may capture multiple objects moving in various directions and speeds, and a block may include an edge or object boundary. In some implementations, block based coding efficiency may be improved by partitioning blocks that include multiple areas with distinct characteristics into one or more partitions, which may be rectangular, including square, partitions, corresponding to the distinct content, and encoding the partitions rather than encoding each minimum coding unit independently.

In some implementations, video coding using partitioning may include selecting a partitioning scheme from among multiple candidate partitioning schemes. For example, in some implementations, candidate partitioning schemes for a 64×64 coding unit may include rectangular size partitions ranging in sizes from 4×4 to 64×64, such as 4×4, 4×8, 8×4, 8×8, 8×16, 16×8, 16×16, 16×32, 32×16, 32×z32, 32×64, 64×32, or 64×64. In some implementations, video coding using partitioning may include a full partition search, which may include selecting a partitioning scheme by encoding the coding unit using each available candidate partitioning scheme and selecting the best scheme, such as the scheme that produces the least rate-distortion error. In some implementations of video coding using partitioning, such as offline two-pass encoding, information regarding motion between frames may be generated in a first coding pass, and may be utilized to select a partitioning scheme in a second coding pass. Techniques such as offline two-pass encoding and evaluating rate-distortion error, or other similar metrics, for each candidate partitioning scheme, may be time-consuming, and may utilize more than half of the encoding time. In some implementations, such as video conferencing or other content that includes a static background, a partitioning scheme may be selected based on the difference between previous and current source frames. In some implementations, encoding a video frame using motion-compensated partitioning may identify a partitioning scheme more efficiently than full partition searching, offline two-pass encoding, or partitioning based on inter-frame differences.

In some implementations, encoding a video frame using motion-compensated partitioning may include identifying a partitioning scheme for encoding a current block, such as block 610. In some implementations, identifying a partitioning scheme may include determining whether to encode the block as a single partition of maximum coding unit size, which may be 64×64 as shown, or to partition the block into multiple partitions, which may correspond with the sub-blocks, such as the 32×32 blocks 620 the 16×16 blocks 630, or the 8×8 blocks 640, as shown, and may include determining whether to partition into one or more smaller partitions. For example, a 64×64 block may be partitioned into four 32×32 partitions. Three of the four 32×32 partitions may be encoded as 32×32 partitions and the fourth 32×32 partition may be further partitioned into four 16×16 partitions. Three of the four 16×16 partitions may be encoded as 16×16 partitions and the fourth 16×16 partition may be further partitioned into four 8×8 partitions, each of which may be encoded as an 8×8 partition. In some implementations, identifying the partitioning scheme may include using a partitioning decision tree.

In some implementations, video coding for a current block may include identifying an optimal coding mode from multiple candidate coding modes, which may provide flexibility in handling video signals with various statistical properties, and may improve the compression efficiency. For example, a video coder may evaluate each candidate coding mode to identify the optimal coding mode, which may be, for example, the coding mode that minimizes an error metric, such as a rate-distortion cost, for the current block. In some implementations, the complexity of searching the candidate coding modes may be reduced by limiting the set of available candidate coding modes based on similarities between the current block and a corresponding prediction block. In some implementations, the complexity of searching each candidate coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, alternating block constrained decision mode coding may include alternating between an unconstrained decision mode, wherein the set of candidate coding modes may be fully searched, and a constrained mode, wherein the set of candidate coding modes to be searched may be limited. In some implementations, the alternating may be spatial, temporal, or both spatial and temporal. Spatial alternating may include alternating between constrained and unconstrained modes among immediately adjacent, neighboring, blocks. In some implementations, spatial alternating may be vertical, horizontal, or both. For example, the alternating may be represented as a checkerboard, or chessboard, pattern. Temporal alternating may include alternating between constrained and unconstrained modes among immediately adjacent frames.

Figure 7:
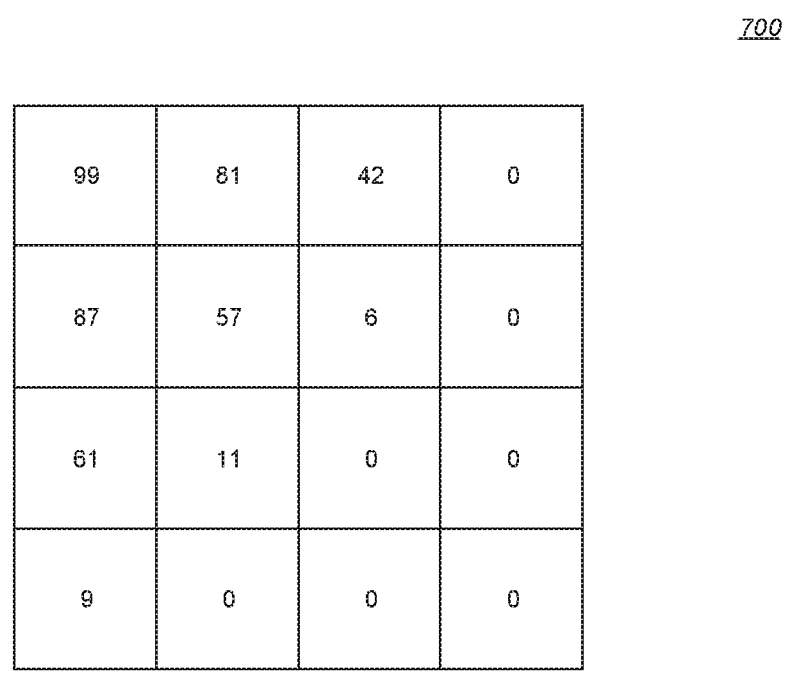

FIG. 7 is a diagram of an example of a quantized transform coefficient matrix 700 including a 4×4 block of quantized transform coefficient values in accordance with implementations of this disclosure. For example, an element of an encoder, such as the quantization unit 430 of the encoder 400 shown in FIG. 4, may generate the quantized transform coefficient matrix 700. Although a 4×4 block is shown for simplicity, any size block may be used. For example, a 64×64 block, a 64×32 block, a 32×64 block, a 32×32 block, a 32×16 block, a 16×32 block, a 16×16 block, a 16×8 block, an 8×16 block, an 8×8 block, an 8×4 block, or a 4×8 block, may be used.

In FIG. 7, the value shown in each location indicates the transform coefficient value for the respective location. For clarity, the location of a transform coefficient for a block may be referred to as the "position," "location," or variations thereof, of the transform coefficient. As used herein references to "proximity," "spatial proximity," or "distance" between transform coefficients may indicate proximity or distance in the transform coefficient matrix representation of the transform coefficients for a block. Although the transform coefficients are described with relation to a transform coefficient matrix, the transform coefficients may be processed or stored in any data structure. For example, the transform coefficients may be processed or stored in a one dimensional array, such as a vector.

In some implementations, a transform, such a symmetric DCT, may tend to group coefficients having large magnitudes in the upper left corner of the block 700 as shown. In some implementations, a transform can distribute larger magnitude coefficients in a different pattern. For example a one dimensional asymmetric discrete sine transform (ADST) combined with a one dimensional DCT may tend to group large magnitude coefficients along one edge of the block, such as the top edge or the left edge.

In some implementations, the matrix of quantized transformed coefficients may be processed in a scan order that tends to group the zero value coefficients at the end of the block and consecutive zero value coefficients at the end of a block in scan order may be omitted from the output bitstream without loss of data. Although not explicitly shown, the two dimensional (2D) transform coefficient matrix may be may be represented by a one dimensional vector array.

Figure 8:
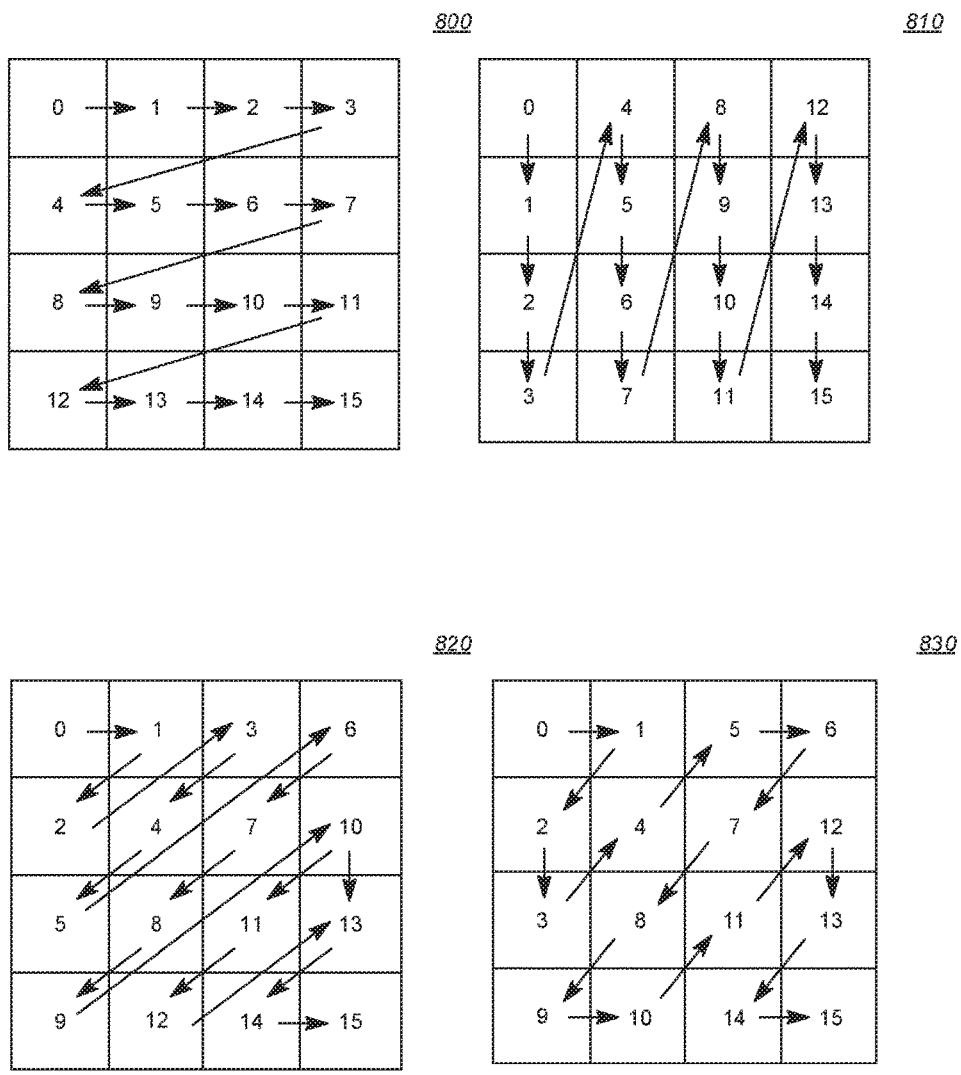
FIG. 8 shows diagrams of examples of entropy coding scan orders in accordance with implementations of this disclosure.

FIG. 8 shows diagrams of examples of entropy coding scan orders in accordance with implementations of this disclosure. In some implementations, entropy coding may include encoding the coefficients of a quantized transform coefficient matrix, such as the quantized transform coefficient matrix 700 shown in FIG. 7, in a scan order, such as a horizontal scan order 800, a vertical scan order 810, a diagonal scan order 820, or a zigzag scan order 830. In FIG. 8, the values shown in each block represent the order that the corresponding coefficient is entropy coded. Although a 4×4 block is shown for simplicity, any size block may be used. For example, a 64×64 block, a 64×32 block, a 32×64 block, a 32×32 block, a 32×16 block, a 16×32 block, a 16×16 block, a 16×8 block, an 8×16 block, an 8×8 block, an 8×4 block, or a 4×8 block, may be used.

In some implementations, encoding the coefficients of a transform coefficient matrix in a scan order may include generating a one dimensional array, such as a vector, of the transform coefficients by including each transform coefficient in the vector in scan order. For example, the DC coefficient, which may be the coefficient in the top left corner of the transform coefficient matrix may be the first element of the scan order vector, may have a transform coefficient matrix location of (0,0) and may have a scan order position of (0). As used herein, the terms "order," "scan position," "vector position," or variations thereof of a transform coefficient indicate a relative position, or index, of the transform coefficient in the scan order or the scan order vector. Although FIG. 8 shows examples of sequential scan patterns, the coefficients may be coded using a non-contiguous scan pattern.

FIG. 9 shows a diagram of an example of a portion of a non-contiguous entropy coding scan order in accordance with implementations of this disclosure. For example, the example shown may be a portion of scan order for a 32×32 block.

Figure 10:
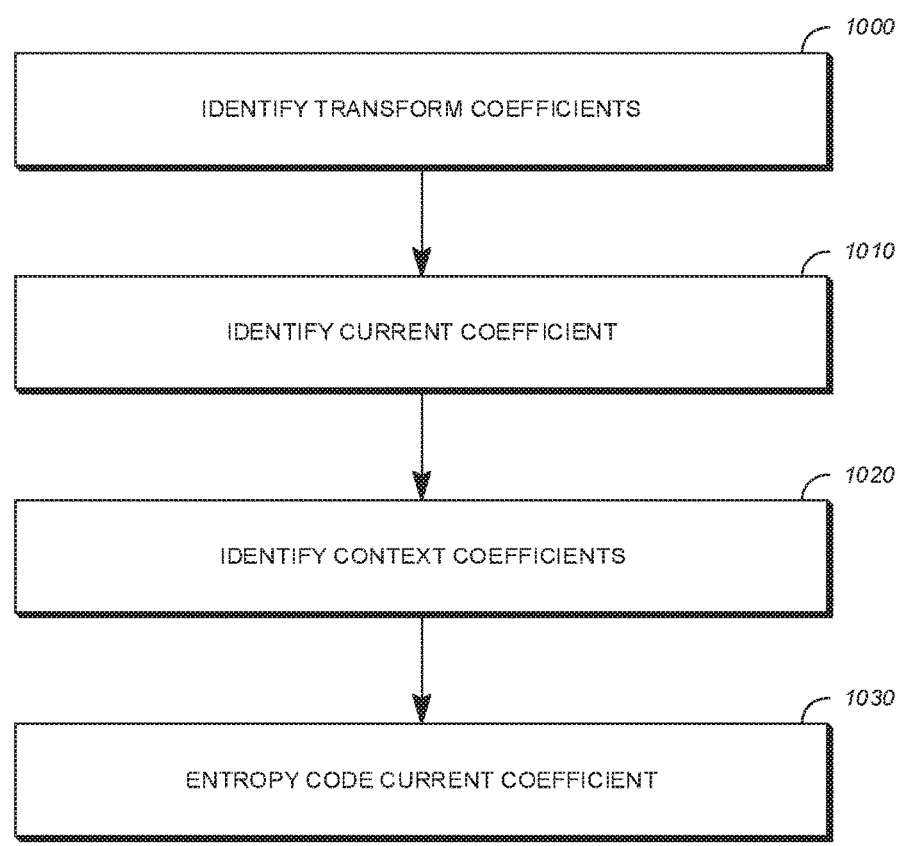
FIG. 10 is a flow diagram of contextual entropy encoding in accordance with implementations of this disclosure.

FIG. 10 is a flow diagram of contextual entropy encoding in accordance with implementations of this disclosure. In some implementations, contextual entropy coding can be implemented in an encoder, such as encoder 400 shown in FIG. 4, of a device, such as the computing device 100 shown in FIG. 1 or the computing and communication devices 100A/100B/100C shown in FIG. 2, as, for example, a computer software program stored in a data storage unit, such as the memory 150 shown in FIG. 1.

In some implementations, contextual entropy coding may include encoding a stream of video data having multiple frames, each having multiple blocks. The video data or stream can be received by the computing device in any number of ways, such as by receiving the video data over a network, over a cable, or by reading the video data from a primary memory or other storage device, including a disk drive or removable media such as a CompactFlash (CF) card, Secure Digital (SD) card, or any other device capable of communicating video data. In some implementations, video data can be received from a video camera connected to the computing device operating the encoder.

In some implementations, contextual entropy coding may include identifying transform coefficients for a current block of a current frame at 1000, identifying a current transform coefficient at 1010, identifying context coefficients for the current transform coefficient at 1020, entropy coding the current transform coefficient at 1030, or a combination thereof.

In some implementations, transform coefficients for a current block of a current frame may be identified at 1000. For example, identifying the transform coefficients may include generating, reading, receiving, or otherwise distinguishing a block of transform coefficients, such as the coefficient matrix 700 shown in FIG. 7, associated with a current block of a current frame. In some implementations, transform coefficients may be numerical values formed by processing pixels of a block of a frame of a video stream to form transform coefficients, by a unit of an encoder, such as transform unit 420 shown in FIG. 4. Although referred to as 'transform coefficients' or 'coefficients' for simplicity, the transform coefficients may be quantized transform coefficients, such as the quantized transform coefficients generated by quantization unit 430 shown in FIG. 4.

In some implementations, the transform coefficients may be ordered based on a scan order, such as the zigzag scan order 830 shown FIG. 8. For example, an ordered one dimensional array, or vector, of transform coefficients may be generated from a two dimensional matrix of transform coefficients by including coefficients in the vector in scan order.

In some implementations, a current transform coefficient may be identified at 1010. For example, entropy coding may include processing the transform coefficients in scan order, and identifying a current transform coefficient may include identifying the next coefficient in scan order. In some implementations, the current transform coefficient may be a zero value transform coefficient, the current block of transform coefficients may not include a subsequent non-zero value transform coefficient, and entropy coding for the current block may be complete.

In some implementations, context coefficients for the current transform coefficient may be identified at 1020. In some implementations, the probability distribution for entropy coding the current coefficient may be adapted based on the context coefficients. In some implementations, the context coefficients may include previously entropy coded coefficients from the current frame that are spatially proximate to the current coefficient. For example, the context coefficients may include previously entropy coded transform coefficients that are spatially proximate to the current coefficient in the current block of transform coefficients, such as the coefficient immediately to the left of the current coefficient, the coefficient immediately above the current coefficient, or the coefficient immediately above and to the left of the current coefficient.

In some implementations, context coefficients identified for the current coefficient may depend on the spatial location of the current coefficient in the transform coefficient matrix.

For example, the current coefficient may be the top-left coefficient in the transform coefficient matrix and identifying context coefficients may be omitted. In some implementations, the current coefficient may be in the top row of the transform coefficient matrix, previously entropy coded coefficients above the current coefficient may not be available and previously entropy coded coefficients to the left of the current coefficient may be identified as the context coefficients. For example, the current coefficient may be the coefficient in the first row and third column of the transform coefficient matrix, and the context coefficients may include the coefficient in the first row and second column and the coefficient in the first row and first column of the transform coefficient matrix. In some implementations, the current coefficient may be in the leftmost column of the transform coefficient matrix, previously entropy coded coefficients to the left of the current coefficient may not be available and previously entropy coded coefficients above the current coefficient may be identified as the context coefficients. For example, the current coefficient may be the coefficient in the third row and first column of the transform coefficient matrix, and the context coefficients may include the coefficient in the second row and first column and the coefficient in the first row and first column of the transform coefficient matrix.

In some implementations, the current transform coefficient may be entropy coded at 1030. In some implementations, entropy coding the current transform coefficient at 1030 may include identifying a token, or codeword, for the current coefficient. In some implementations, entropy coding the current transform coefficient at 1030 may include including the entropy coded current transform coefficient in an output bitstream, such as the compressed bitstream 404 shown in FIG. 4.

For example, the token for the current coefficient may be included in the output bitstream to represent the current coefficient. In some implementations, entropy coding the current transform coefficient at 1030 may include storing or transmitting the output bitstream. For example, the encoded video bitstream, including the token representing the entropy coded current transform coefficient, may be transmitted as a signal via a network, such as the network 220 shown in FIG. 2, such that a device, such as the computing device 100 shown in FIG. 1 or the computing and communication devices 100A/100B/100C shown in FIG. 2, which may include a decoder, such as the decoder 500 shown in FIG. 5, may receive the signal via the network, may decode the encoded video bitstream, and may generate a reconstructed frame, or a portion of a reconstructed frame, corresponding to the current frame.

In another example, the encoded video bitstream, including the token representing the entropy coded current transform coefficient, may be stored in a memory, such as the memory 150 shown in FIG. 1, of a device, such as the computing device 100 shown in FIG. 1 or the computing and communication devices 100A/100B/100C shown in FIG. 2, as a stored encoded video, such that the device, or any other device capable of accessing the memory, may retrieve the stored encoded video, such that a decoder, such as the decoder 500 shown in FIG. 5, may decode the encoded video, and may generate a reconstructed frame, or a portion of a reconstructed frame, corresponding to the current frame.

Other implementations of the diagram of contextual entropy encoding as shown in FIG. 10 are available. In implementations, additional elements of contextual entropy encoding can be added, certain elements can be combined, and/or certain elements can be removed. For example, in an implementation, contextual entropy encoding can include an additional element involving generating entropy coding models.

Figure 11:
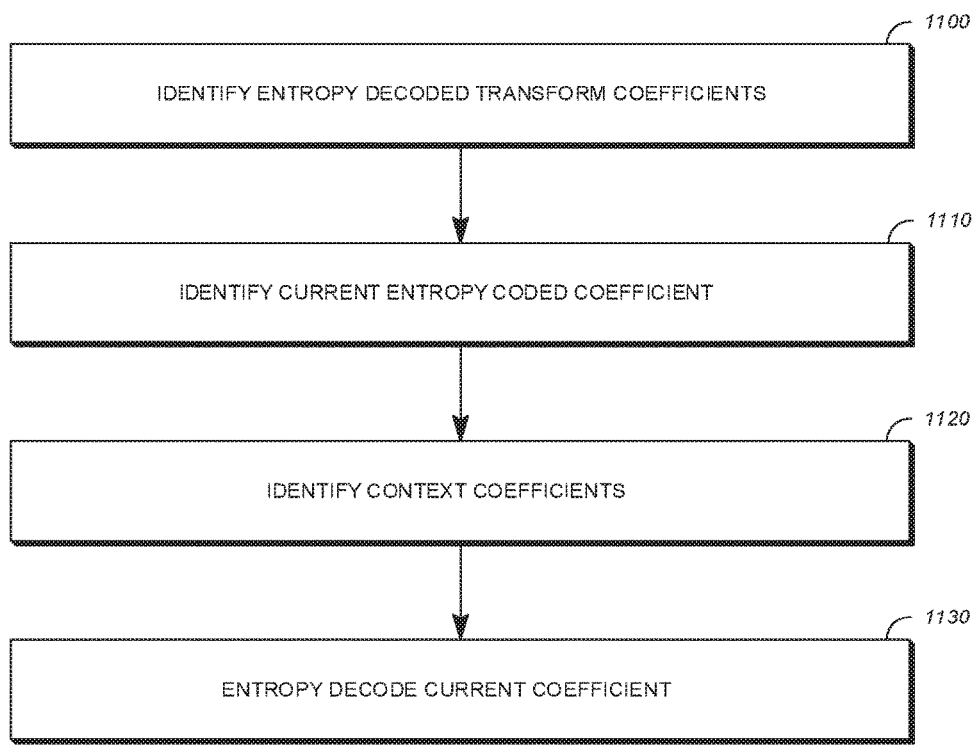
FIG. 11 is a flow diagram of contextual entropy decoding in accordance with an implementation of this disclosure.

FIG. 11 is a flow diagram of contextual entropy decoding in accordance with an implementation of this disclosure. In some implementations, contextual entropy decoding can be implemented in an decoder, such as decoder 500 shown in FIG. 5, of a device, such as the computing device 100 shown in FIG. 1 or the computing and communication devices 100A/100B/100C shown in FIG. 2, as, for example, a computer software program stored in a data storage unit, such as the memory 150 shown in FIG. 1.

In some implementations, contextual entropy decoding may include identifying entropy decoded transform coefficients for a current block of a current frame at 1100, identifying a current entropy coded transform coefficient at 1110, identifying context coefficients for the current entropy coded transform coefficient at 1120, entropy decoding the current entropy coded transform coefficient at 1130, or a combination thereof.

Although not explicitly shown in FIG. 11, contextual entropy decoding may include receiving a signal including an encoded video stream, or a portion of an encoded video stream, via a network, such as the network 220 shown in FIG. 2, or retrieving an encoded video stream, or a portion of an encoded video stream, from a memory, such as such as the memory 150 shown in FIG. 1. For simplicity, as used herein, receiving may include receiving via a network, retrieving from memory, or otherwise ascertaining the identified information.

In some implementations, entropy decoded transform coefficients for a current block of a current frame may be identified at 1100. For example, identifying the entropy decoded transform coefficients at 1100 may include identifying a current block of a current frame of a current video stream, and generating the entropy decoded transform coefficients for the current block from the encoded video stream.

In some implementations, identifying the entropy decoded transform coefficients may include identifying a scan order for the current block. For example, the encoded video stream may be received as a one dimensional array, or vector, of tokens, or codewords, wherein each token represents an encoded transform coefficient of the current block in a scan order. For example, the token corresponding to the transform coefficient in the top-left location of a transform coefficient matrix may be the first token received and entropy decoded, and the next token in scan order may be the next token received and entropy decoded. In some implementations, identifying the entropy decoded transform coefficients may include identifying a location for each entropy decoded transform coefficient in a transform coefficient matrix for the current block based on the order the entropy decoded transform coefficient is received and the scan order.

In some implementations, a current entropy coded transform coefficient may be identified at 1110. For example, a current token, or codeword, representing the current entropy coded transform coefficient may be identified in the received encoded bitstream. In some implementations, identifying the current entropy coded transform coefficient at 1110 may include identifying a location of the transform coefficient represented by the current token in the transform coefficient matrix for the current block. For example, the current token may be received as part of a one dimensional sequence, or vector array, and a location of the corresponding transform coefficient in the transform coefficient matrix for the current block may be identified based on the scan order for the current block. For simplicity, the transform coefficient represented by the current token may be referred to as the current transform coefficient or the current coefficient.

In some implementations, context coefficients for entropy decoding the current transform coefficient from the current token may be identified at 1120. In some implementations, the current token may be entropy decoded based on a probability distribution, and the probability distribution for entropy decoding the current coefficient may be adapted based on the context coefficients.

In some implementations, the context coefficients may include previously entropy decoded coefficients from the current frame that are spatially proximate to the location of the current transform coefficient in the transform coefficient matrix. For example, the context coefficients may include previously entropy decoded transform coefficients that are spatially proximate to the location of the current coefficient in the current block of transform coefficients, such as the coefficient immediately to the left of the location of the current coefficient, the coefficient immediately above the location of the current coefficient, or the coefficient immediately above and to the left of the location of the current coefficient.

In some implementations, the context coefficients for entropy decoding the current coefficient may identified based on the spatial location of the current coefficient in the transform coefficient matrix. For example, the current coefficient may be the top-left coefficient in the transform coefficient matrix and identifying context coefficients may be omitted.

In some implementations, the current coefficient may be in the top row of the transform coefficient matrix, previously entropy decoded coefficients above the current coefficient may not be available and previously entropy decoded coefficients to the left of the current coefficient may be identified as the context coefficients. For example, the current coefficient may be the coefficient in the first row and third column of the transform coefficient matrix, and the context coefficients may include the entropy decoded coefficient in the first row and second column and the entropy decoded coefficient in the first row and first column of the transform coefficient matrix. In some implementations, the current coefficient may be in the leftmost column of the transform coefficient matrix, previously entropy decoded coefficients to the left of the current coefficient may not be available and previously entropy decoded coefficients above the current coefficient may be identified as the context coefficients. For example, the current coefficient may be the coefficient in the third row and first column of the transform coefficient matrix, and the context coefficients may include the entropy decoded coefficient in the second row and first column and the entropy decoded coefficient in the first row and first column of the transform coefficient matrix.

In some implementations, the current transform coefficient may be entropy decoded at 1130. In some implementations, entropy decoding the current transform coefficient at 1130 may include identifying a value of the current transform coefficient. In some implementations, entropy decoding the current transform coefficient may include including the value of the current transform coefficient in the transform coefficient matrix for the current block at the location identified for the current transform coefficient at 1110.

Although not shown in FIG. 11, contextual entropy decoding may be performed for each coefficient in the transform coefficient matrix for the current block, and an output video stream, such as the output video stream 504 shown in FIG. 5, or a portion of the output video stream, may be generated based on the transform coefficient matrix for the current block as shown in FIG. 5. For example, the transform coefficient matrix for the current block may be output to a dequantization unit, such as the dequantization unit 520 shown in FIG. 5, or may be stored in a memory, such as the memory 150 shown in FIG. 1. In some implementations, the decoded video stream may be output to a presentation unit, such as the user interface 130 shown in FIG. 1, for display.

Other implementations of the diagram of contextual entropy decoding as shown in FIG. 11 are available. In implementations, additional elements of contextual entropy decoding can be added, certain elements can be combined, and/or certain elements can be removed. For example, in an implementation, contextual entropy decoding can include an additional element involving generating entropy coding models.

In some implementations, contextual entropy decoding may include storing each decoded coefficient for a block in a decoder coefficient register, which may be stored in a data storage unit, such as the memory 150 shown in FIG. 1, and identifying the context coefficients at 1120 may include reading the context coefficients from the decoder coefficient register.

In some implementations, the size of the context coefficient register may be a function of the size of the coefficient matrix used for coding. For example, the coefficient matrix may be a N×M matrix, such as a 32×32 matrix, encoded using a non-contiguous coding order, such as the coding order partially shown in FIG. 9, and the context coefficient register may include N*M coefficients, such as 1024 (32*32=1024) coefficients. In some implementations, each coefficient may be stored using B bits, such as 3 bits, and the size of the context coefficient register may be B*N*M bits, such as 3072 bits (1024*3 bits).

Figure 12:
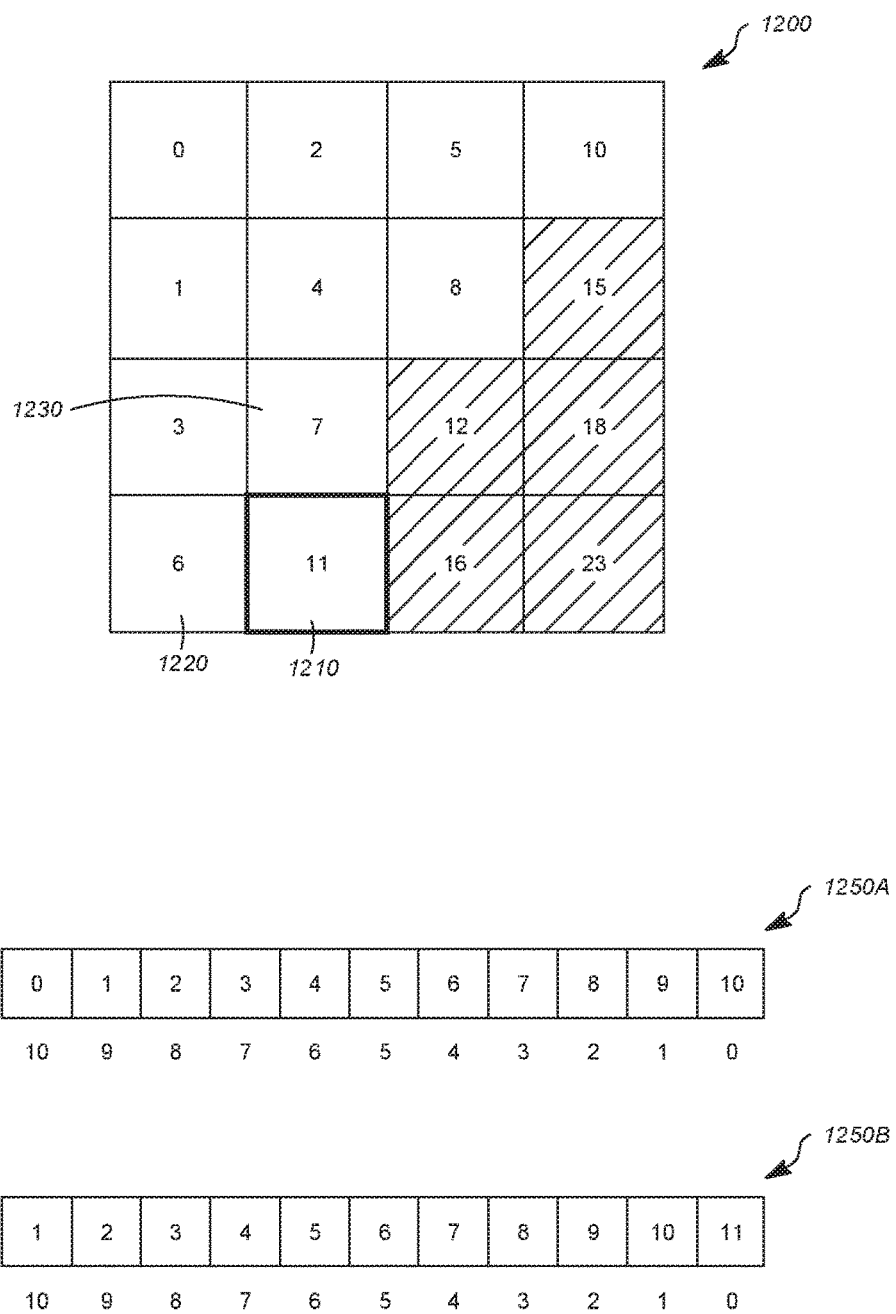
FIG. 12 is a diagram of an example of a representation of a portion of a transform coefficient scan pattern for encoding and decoding using efficient context handling in arithmetic coding in accordance with implementations of this disclosure.

FIG. 12 is a diagram of an example of a representation of a portion 1200 of a transform coefficient scan pattern for encoding and decoding using efficient context handling in arithmetic coding in accordance with implementations of this disclosure. In some implementations, efficient context handling in arithmetic coding may include decoding a current coefficient based on a reduced size context coefficient register. For example, efficient context handling in arithmetic coding may include decoding a current coefficient for a 32×32 matrix encoded using the non-contiguous coding order, such as the non-contiguous coding order partially shown in FIG. 9 or at 1200 in FIG. 12, based on a context coefficient register including 87 coefficients.

In an example, a current coefficient 1210 at scan order location 11 may be decoded using the coefficient to the left of the current coefficient, such as the coefficient 1220 at scan order location 6, the coefficient above the current coefficient, such as the coefficient 1230 at scan order location 7, or a combination thereof. In FIG. 12, the current scan order location, corresponding to the current encoded coefficient, is shown with a bold boarder, scan order locations corresponding to decoded coefficients are shown with a white background, and scan order locations corresponding to encoded coefficients are shown with a lined background.

An example of a portion (i.e., a decoder coefficient register 1250A) of the context coefficient register is shown, including the coefficients at scan order locations 10, 9, 8, 7, 6, 5, 4, 3, 2, 1, and 0. The portion of the context coefficient register after a shift operation is shown at 1250B, and includes the coefficients at scan order locations 11, 10, 9, 8, 7, 6, 5, 4, 3, 2, and 1.

Figure 13:
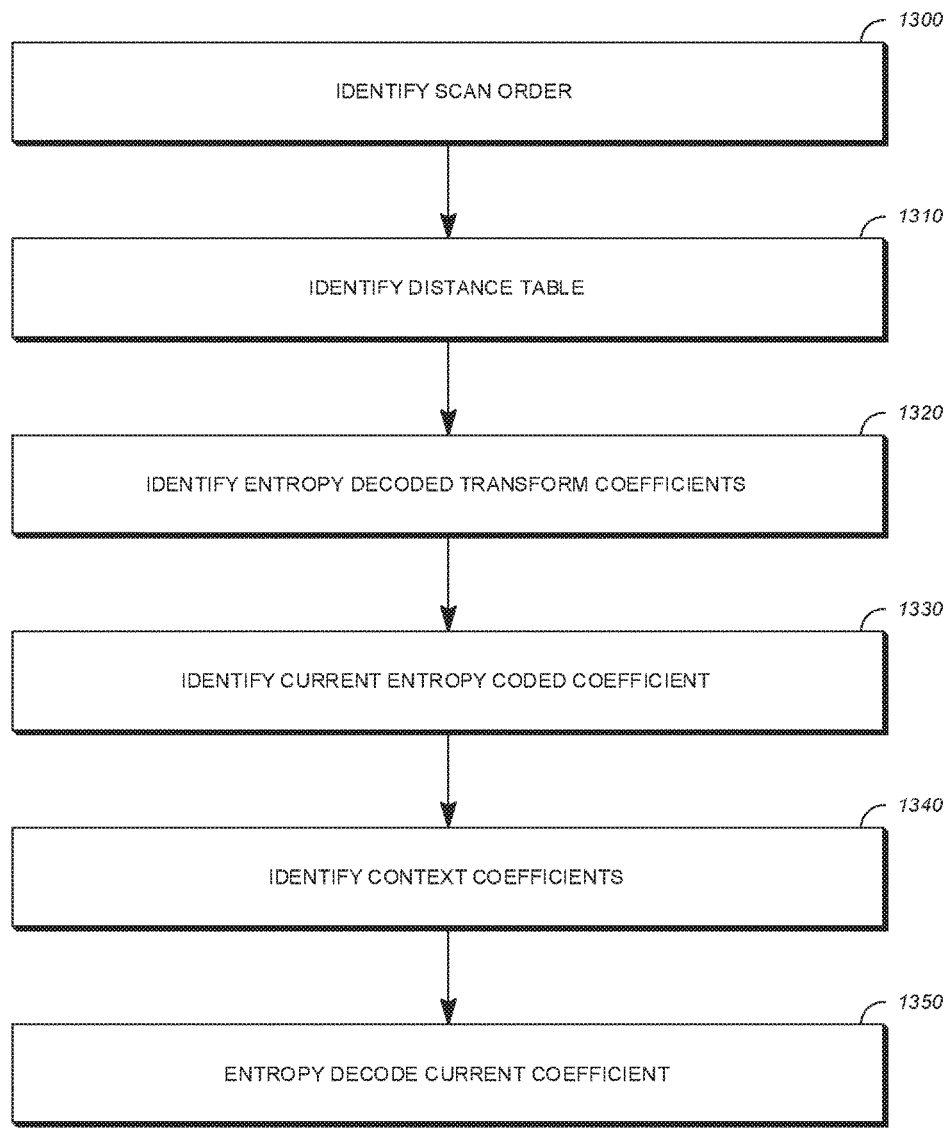
FIG. 13 is a flow diagram of contextual entropy decoding using efficient context handling in arithmetic coding in accordance with an implementation of this disclosure.

FIG. 13 is a flow diagram of contextual entropy decoding using efficient context handling in arithmetic coding in accordance with an implementation of this disclosure. In some implementations, contextual entropy decoding using efficient context handling in arithmetic coding can be implemented in an decoder, such as decoder 500 shown in FIG. 5, of a device, such as the computing device 100 shown in FIG. 1 or the computing and communication devices 100A/100B/100C shown in FIG. 2, as, for example, a computer software program stored in a data storage unit, such as the memory 150 shown in FIG. 1.

In some implementations, contextual entropy decoding using efficient context handling in arithmetic coding may include identifying a scan order at 1300, identifying a distance table at 1310, identifying entropy decoded transform coefficients for a current block of a current frame at 1320, identifying a current entropy coded transform coefficient at 1330, identifying context coefficients for the current entropy coded transform coefficient at 1340, entropy decoding the current entropy coded transform coefficient at 1350, or a combination thereof.

Although not explicitly shown in FIG. 13, contextual entropy decoding may include receiving a signal including an encoded video stream, or a portion of an encoded video stream, via a network, such as the network 220 shown in FIG. 2, or retrieving an encoded video stream, or a portion of an encoded video stream, from a memory, such as such as the memory 150 shown in FIG. 1. For simplicity, as used herein, receiving may include receiving via a network, retrieving from memory, or otherwise ascertaining the identified information.

In some implementations, a scan order for the current block of the current frame may be identified at 1300. For example, the current block may be a 32×32 block and the scan order may be a 32×32 scan order, such as the scan order partially shown in FIGS. 9 and 12.

In some implementations, a distance table may be identified at 1310. In some implementations, identifying the distance table may include identifying a defined distance table, such as a previously generated distance table. In some implementations, identifying the distance table may include generating the distance table. In some implementations, generating the distance table may include determining scan order distances between a target coefficient and context coefficients for the context coefficient. For example, referring to FIG. 12, the target coefficient may be the coefficient at scan order position 11, the left context coefficient may be the coefficient at scan order position 6, the above context coefficient may be the coefficient at scan order position 7, the scan order distance between the target coefficient at 11 and the left context coefficient at 6 may be 5, and the scan order distance between the target coefficient at 11 and the above context coefficient at 7 may be 4. In some implementations, scan order distance values may be identified for each coefficient in the current block, which may exclude the coefficient in scan order location zero (0).

Although not shown separately in FIG. 13, in some implementations, contextual entropy decoding using efficient context handling in arithmetic coding may include determining a size for a decoder coefficient register based on the distance table identified at 1310. In some implementations, the size of the decoder coefficient register may be one less than the maximal distance value identified at 1310 for a block based on the scan order.

In some implementations, entropy decoded transform coefficients for a current block of a current frame may be identified at 1320. For example, identifying the entropy decoded transform coefficients at 1320 may include identifying a current block of a current frame of a current video stream, and generating the entropy decoded transform coefficients for the current block from the encoded video stream.

In some implementations, the entropy decoded transform coefficients may be identified based on the scan order identified for the current block at 1300. For example, the encoded video stream may be received as a one dimensional array, or vector, of tokens, or codewords, wherein each token represents an encoded transform coefficient of the current block in a scan order. For example, the token corresponding to the transform coefficient in the top-left location of a transform coefficient matrix may be the first token received and entropy decoded, and the next token in scan order may be the next token received and entropy decoded. In some implementations, identifying the entropy decoded transform coefficients may include identifying a location for each entropy decoded transform coefficient in a transform coefficient matrix for the current block based on the order the entropy decoded transform coefficient is received and the scan order.

In some implementations, one or more of the entropy decoded transform coefficients may be stored in a decoder coefficient register, such as the decoder coefficient register 1250 shown in FIG. 12. In some implementations, storing the entropy decoded transform coefficients in the decoder coefficient register may include decoding a transform coefficient and performing a shift operation to store the entropy decoded transform coefficient in the decoder coefficient register. In some implementations, the decoder coefficient register may be full and an entropy decoded transform coefficient, such as the most distantly decoded entropy decoded transform coefficient, may be removed from the decoder coefficient register.

In some implementations, a current entropy coded transform coefficient may be identified at 1330. For example, a current token, or codeword, representing the current entropy coded transform coefficient may be identified in the received encoded bitstream. In some implementations, identifying the current entropy coded transform coefficient at 1330 may include identifying a location of the transform coefficient represented by the current token in the transform coefficient matrix for the current block. For example, the current token may be received as part of a one dimensional sequence, or vector array, and a location of the corresponding transform coefficient in the transform coefficient matrix for the current block may be identified based on the scan order for the current block. For simplicity, the transform coefficient represented by the current token may be referred to as the current transform coefficient or the current coefficient.

In some implementations, context coefficients for entropy decoding the current transform coefficient from the current token may be identified at 1340. In some implementations, the current token may be entropy decoded based on a probability distribution, and the probability distribution for entropy decoding the current coefficient may be adapted based on the context coefficients.

In some implementations, the context coefficients may include previously entropy decoded coefficients from the current frame that are spatially proximate to the location of the current transform coefficient in the transform coefficient matrix. For example, the context coefficients may include previously entropy decoded transform coefficients that are spatially proximate to the location of the current coefficient in the current block of transform coefficients, such as the coefficient immediately to the left of the location of the current coefficient, the coefficient immediately above the location of the current coefficient, or the coefficient immediately above and to the left of the location of the current coefficient.

In some implementations, the context coefficients for entropy decoding the current coefficient may be identified based on the spatial location of the current coefficient in the transform coefficient matrix. For example, the current coefficient may be the top-left coefficient in the transform coefficient matrix and identifying context coefficients may be omitted.

In some implementations, the current coefficient may be in the top row of the transform coefficient matrix, previously entropy decoded coefficients above the current coefficient may not be available and previously entropy decoded coefficients to the left of the current coefficient may be identified as the context coefficients. For example, the current coefficient may be the coefficient in the first row and third column of the transform coefficient matrix, and the context coefficients may include the entropy decoded coefficient in the first row and second column and the entropy decoded coefficient in the first row and first column of the transform coefficient matrix. In some implementations, the current coefficient may be in the leftmost column of the transform coefficient matrix, previously entropy decoded coefficients to the left of the current coefficient may not be available and previously entropy decoded coefficients above the current coefficient may be identified as the context coefficients. For example, the current coefficient may be the coefficient in the third row and first column of the transform coefficient matrix and the context coefficients may include the entropy decoded coefficient in the second row and first column and the entropy decoded coefficient in the first row and first column of the transform coefficient matrix.

In some implementations, the context coefficients may be identified from the decoder coefficient register based on the distance values identified at 1310. For example, referring to FIG. 12, the current coefficient may be the current coefficient 1210 at scan order location 11, the distance table identified at 1310 may indicate a context coefficient distance for the left context coefficient of five (5), and the value of the coefficient corresponding to scan order position six (6) may be identified at the fifth decoder coefficient register position, which has an index of four (4) in the zero based decoder coefficient register 1250A shown in FIG. 12. Similarly, the distance table identified at 1310 may indicate a context coefficient distance for the above context coefficient of four (4), and the value of the coefficient corresponding to scan order position seven (7) may be identified at the fourth decoder coefficient register position, which has an index of three (3) in the zero based decoder coefficient register 1250A shown in FIG. 12.

In some implementations, the current transform coefficient may be entropy decoded at 1350. In some implementations, entropy decoding the current transform coefficient at 1350 may include identifying a value of the current transform coefficient. In some implementations, entropy decoding the current transform coefficient may include including the value of the current transform coefficient in the transform coefficient matrix for the current block at the location identified for the current transform coefficient at 1330.

In some implementations, entropy decoding the current transform coefficient may include performing a shift operation to store the entropy decoded transform coefficient in the decoder coefficient register. For example, referring to FIG. 12, a shift operation may be performed on the decoder coefficient register 1250A to store the coefficient corresponding to scan order position 11, as shown in decoder coefficient register 1250B.

Although not shown in FIG. 13, contextual entropy decoding may be performed for each coefficient in the transform coefficient matrix for the current block, and an output video stream, such as the output video stream 504 shown in FIG. 5, or a portion of the output video stream, may be generated based on the transform coefficient matrix for the current block as shown in FIG. 5. For example, the transform coefficient matrix for the current block may be output to a dequantization unit, such as the dequantization unit 520 shown in FIG. 5, or may be stored in a memory, such as the memory 150 shown in FIG. 1. In some implementations, the decoded video stream may be output to a presentation unit, such as the user interface 130 shown in FIG. 1, for display.

Other implementations of the diagram of contextual entropy decoding as shown in FIG. 13 are available. In implementations, additional elements of contextual entropy decoding can be added, certain elements can be combined, and/or certain elements can be removed. For example, in an implementation, contextual entropy decoding can include an additional element involving generating entropy coding models.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a general purpose computer or general purpose/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting station 100A and receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method for decoding a current block in a scan order comprising:

identifying a current entropy coded transform coefficient from the current block;

entropy decoding the current entropy coded transform coefficient to obtain an entropy decoded current transform coefficient, wherein entropy decoding the current entropy coded transform coefficient comprises:

determining, based on the scan order and using a scan order distance table, a first scan order distance,
the first scan order distance being a difference between a first scan order location corresponding to the current entropy coded transform coefficient and a second scan order location corresponding to a first context coefficient, and
the scan order distance table includes, for the first scan order location, the first scan order distance;
identifying, using the first scan order distance, a first location into a context coefficient register;
identifying, at the first location of the context coefficient register, a first context coefficient value; and
entropy decoding the current entropy coded transform coefficient based on the first context coefficient value; and
including the entropy decoded current transform coefficient in an output bitstream.

2. The method of claim 1, wherein entropy decoding the current entropy coded transform coefficient further comprises:
determining, based on the scan order, a second scan order distance between the first scan order location corresponding to the current entropy coded transform coefficient and a scan order location corresponding to a second context coefficient, wherein the scan order location corresponding to the second context coefficient is spatially proximate to the first scan order location corresponding to the current entropy coded transform coefficient;
identifying a second context coefficient value from a second location in the context coefficient register, the second location corresponding to the second scan order distance; and
entropy decoding the current entropy coded transform coefficient based on the first context coefficient value and the second context coefficient value.

3. The method of claim 2, wherein the first context coefficient is left of the current entropy coded transform coefficient, and the second context coefficient is above the current entropy coded transform coefficient.

4. The method of claim 1, wherein the scan order is a 32×32 scan order, and a size of the context coefficient register is 87.

5. The method of claim 1, wherein entropy decoding the current entropy coded transform coefficient further comprises:
determining a size for the context coefficient register as one less than a maximal scan order distance for the scan order.

6. The method of claim 1, wherein entropy decoding the current entropy coded transform coefficient further comprises:
removing a most distantly decoded entropy decoded transform coefficient from the context coefficient register.

7. A method for entropy decoding a current entropy coded transform coefficient from a current block, the current block being decoded in a scan order, the scan order being non-contiguous, the method comprising:
determining, based on the scan order, a first scan order distance, the first scan order distance being a difference between a first scan order location corresponding to the current entropy coded transform coefficient and a second scan order location corresponding to a first context coefficient;
identifying a first context coefficient value from a first location in a context coefficient register, the first location corresponding to the first scan order distance;
determining, based on the scan order, a second scan order distance between the first scan order location corresponding to the current entropy coded transform coefficient and a scan order location corresponding to a second context coefficient, wherein the scan order location corresponding to the second context coefficient is spatially proximate to the first scan order location corresponding to the current entropy coded transform coefficient;
identifying a second context coefficient value from a second location in the context coefficient register, the second location corresponding to the second scan order distance; and
entropy decoding, to obtain an entropy decoded current transform coefficient, the current entropy coded transform coefficient based on the first context coefficient value and the second context coefficient value;
including the entropy decoded current transform coefficient in an output bitstream for display; and
performing a shift operation to include the entropy decoded current transform coefficient in the context coefficient register, wherein the context coefficient register is a first-in-first-out register and the entropy decoded current transform coefficient is added at a tail of the context coefficient register.

8. The method of claim 7, wherein the first context coefficient is left of the current entropy coded transform coefficient, and the second context coefficient is above the current entropy coded transform coefficient.

9. The method of claim 7, further comprising:
identifying the first scan order distance and the second scan order distance from a scan order distance table for the scan order.

10. The method of claim 9, further comprising:
determining a size for the context coefficient register based on the scan order distance table.

11. The method of claim 7, wherein the context coefficient register is sized as a function of a size of the current block.

12. The method of claim 7, wherein a size of the context coefficient register is one less than a maximal scan order distance for the scan order.

13. An apparatus for decoding a current entropy coded transform coefficient of a current block, the current block being decoded using a scan order, the apparatus comprising:
a memory; and
a processor configured to execute instructions stored in the memory to:
entropy decode the current entropy coded transform coefficient by:
determining, based on the scan order, a left scan order distance, the left scan order distance being a difference between a first scan order location corresponding to the current entropy coded transform coefficient and a second scan order location corresponding to a left context coefficient;
determining, based on the scan order, an above scan order, the above scan order distance being a difference distance between the first scan order location corresponding to the current entropy coded transform coefficient and a third scan order location corresponding to an above context coefficient;
identifying, using the left scan order distance as a first index into a context coefficient register, a left context coefficient value;

identifying, using the above scan order distance as a second index into the context coefficient register, an above context coefficient value; and entropy decoding, to obtain an entropy decoded current transform coefficient, the current entropy coded transform coefficient based on the left context coefficient value and the above context coefficient value; and include the entropy decoded current transform coefficient in an output bitstream.

14. The apparatus of claim 13, wherein the processor is configured to execute instructions stored in the memory to:
identify the left scan order distance and the above scan order distance from a scan order distance table for the scan order.

15. The apparatus of claim 14, wherein the processor is configured to execute instructions stored in the memory to:
identify the scan order distance table such that the scan order distance table includes a left context coefficient scan order distance and an above context coefficient scan order distance for each respective scan order location in the scan order.

16. The apparatus of claim 13, wherein the scan order is a 32×32 scan order, and a size of the context coefficient register is 87.

17. The apparatus of claim 13, wherein entropy decoding the current entropy coded transform coefficient includes:
determining a size for the context coefficient register as one less than a maximal scan order distance for the scan order.

* * * * *